UNITED STATES PATENT OFFICE.

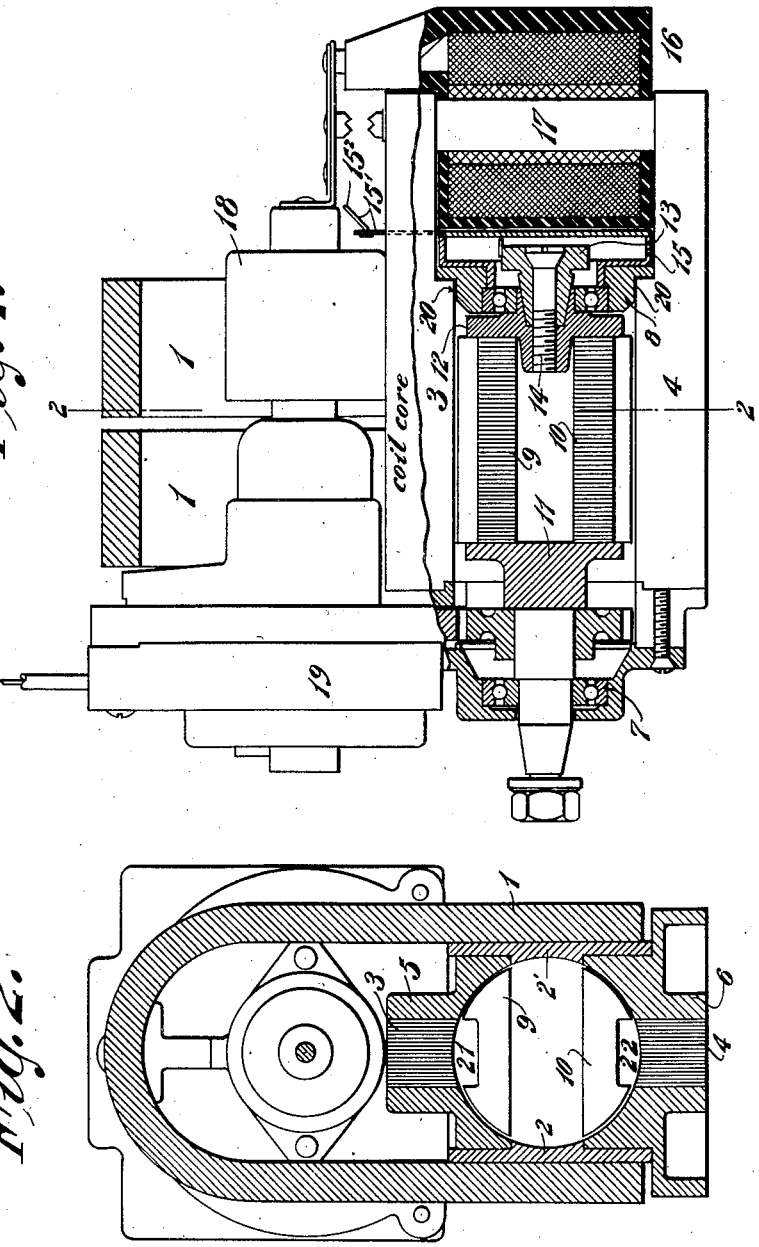

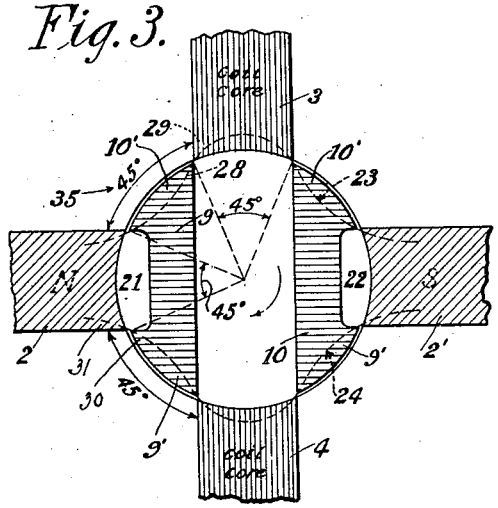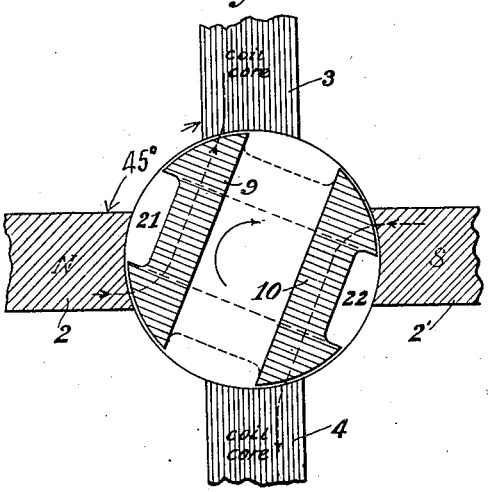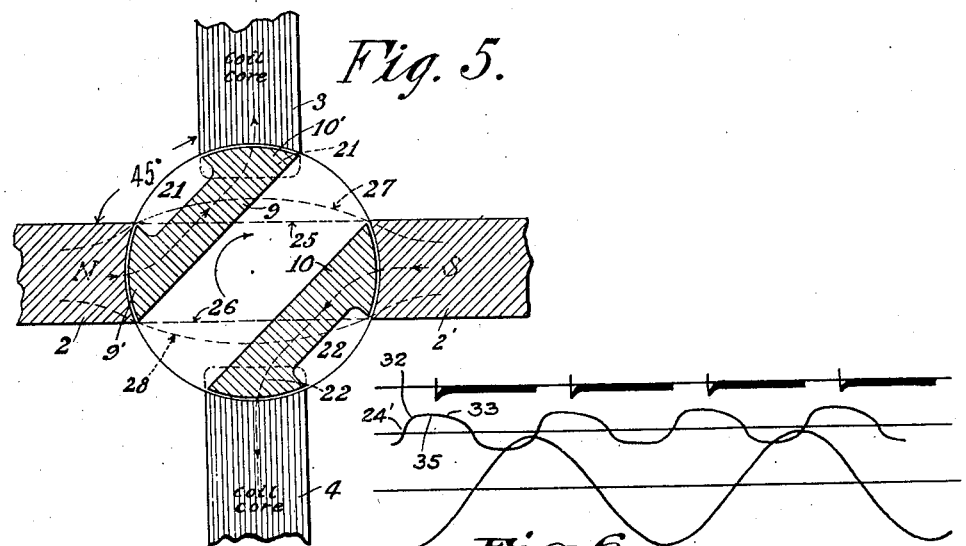

EDWARD T. SHAW, OF PITTSFIELD, MASSACHUSETTS.

MAGNETO-ELECTRIC MACHINE.

1,323,553.  Specification of Letters Patent.  Patented Dec. 2, 1919.

Application filed March 23, 1916. Serial No. 86,131.

*To all whom it may concern:*

Be it known that I, EDWARD T. SHAW, a citizen of the United States of America, residing in the city of Pittsfield, county of Berkshire, and State of Massachusetts, have invented certain new and useful Improvements in Magneto-Electric Machines, of which the following is a specification.

This invention relates to improvements in magneto electric machines of the type shown in the Letters Patent of the United States granted to Theodor M. Mueller, Dec. 21, 1909, numbered 943,697 and on May 24, 1910, numbered 958,754, and that granted to James B. Frawley Nov. 16, 1915, numbered 1,160,995.

The magneto electric machines shown in the above mentioned patents are particularly designed for electric ignition purposes. The present invention has for its object to provide means whereby the wave of the current generated will assume a substantially rectangular shaped wave form. In the type of electric ignition machine granted to James B. Frawley, referred to above, the sector shaped inductor elements that are rotated past the magnet poles and the coil poles are formed with curved surfaces that are concentric with the face of said holes.

My present improvement comprehends a form of inductor shoe or element wherein its outer curved surface is provided, or formed, with a cut out, notched, or channel portion of the same angular extent as the air gap adjacent the poles of the magnet and coil cores, the extent of which is practically 45 degrees, or in other words, its periphery at the middle third portion is cut away, it being understood that the angular length of curvature of the inductor shoe is substantially 135 degrees in extent. By forming the inductor shoes in this manner the rate of flux change through the coil cores and induction coil would be more nearly constant during the active or spark generation period and the wave of generated current would be nearly rectangular in shape. This increased range of high current generation in which the crest or top of the wave of generated current is substantially flat throughout nearly 90 electrical degrees, permits a maximum angle of spark adjustment that is very desirable and one which approaches nearly 45 degrees of rotation of the inductor shoes, or 90 degrees electrical angle, as will be fully described in the body of the specification, and will be specifically pointed out in the claims.

In the accompanying drawings forming a part of the application: Figure 1 is a longitudinal sectional view taken on a plane through the axis of the shaft of the machine showing the laminated inductor shoes with the groove or channel portion formed in the upper and lower edges of the shoes, also, the bearing box timer casing, and the induction coil.

Fig. 2 is a transverse vertical sectional view on the line 2—2 of Fig. 1, showing the extent of the groove or cut-out portion in the inductor shoes.

Fig. 3 is a diagrammatic view of the field and coil poles and the grooved inductor shoes.

Fig. 4 is a view similar to Fig. 3 but showing the inductor shoes in their midway position, so that one half of the grooved portion is between the poles.

Fig. 5 is a view similar to Fig. 3 showing the inductor shoes in a position in which the metal adjacent the cut-out portions of the shoes register with the poles of the field magnets and coil cores.

Fig. 6 is a view showing the form taken by the current on short circuit.

Referring to the drawings in detail: 1 designates the permanent field magnets, 2 and 2' the soft iron magnet-pole pieces that are secured to the poles of the magnets 1 in any suitable manner, 3 and 4 are the coil cores which are angularly spaced from the pole pieces 2 and 2' a distance of 90 degrees. These cores are preferably built up of soft iron laminations to reduce eddy current losses, and are clamped or held in place by means of the holders 5 and 6 composed of some non-magnetic material, as, for example, brass. 7 and 8 are bearing boxes for rotatably supporting the segmental shaped inductor shoes 9 and 10 which are rigidly clamped between the disk-shaped pieces 11 and 12, also composed of some non-magnetic material. A timer cam 13 is secured to the disk 12 by means of the screw 14 which is located within the casing 15 which is angularly adjustable about the shaft for varying the position or timing of the spark by any suitable means, as a rod 15' and connection 15². This casing may, if desired, be placed at any other convenient location on the machine since it is not necessary that it be placed at the inner ends of the rotating inductor shoes 9 and 10.

The induction coil is indicated as a whole by the numeral 16. This coil is located, as shown, between the rearwardly extended ends of the coil cores 3 and 4. 17 is the core of the induction coil, the ends of which are in close mechanical contact with the cores 3 and 4. The usual condenser and distributing devices are indicated at 18 and 19. These devices do not, however, form any part of the present invention.

In order to prevent the formation of a closed electric circuit through the metal bearing box 8 and timer casing 15 which would be caused by reason of the flux of the magnetic field surging back and forth through the cores 3 and 4 in opposite directions when the inductor shoes 9 and 10 are rotated, insulating material 20 is inserted between the bearing box 8 and timer casing 15, as shown.

The two inductor shoes 9 and 10, it will be observed, are formed with cutout grooved or air gap portions 21 and 22. As the invention refers only to the manipulation of the air gap, the theoretical discussion will be confined to the effect of the air gap upon the form of current wave generated.

Having thus briefly referred, in a general way, to the construction and arrangement of the operative parts of the machine, reference will now be had to the specific electrical features of the present invention and in this connection reference is had to the diagrammatic Figs. 3, 4, 5, and 6. The path of the magnetic flux in this position of the inductor shoes in Fig. 3 is shown by the dotted lines 23 and 24. Their polarity would neutralize each other and would simply flow from one pole to the other magnet poles 2 and 2'. This corresponds to the zero point of the current wave as indicated at 24'.

In the second position of the inductor shoes 9 and 10 shown in Fig. 4, one-half the air gap area is in circuit and therefore in so far as air gap can affect the operation of the machine one half of the maximum flux will be passing through the coil giving a current at this instant of value indicated at point 35 Fig. 6. In the position of the inductor shoes shown in Fig. 5 the maximum air gap area is in circuit and the maximum magnetic flux will flow through the coil. This position corresponds with point 33 of the curve. From that point the flux impressed and likewise the current drops to zero value when the inductor shoes reach a position parallel with the poles 2 and 2'.

It should be observed that the length of the arc of each of the inductor shoes is 135 degrees and that the middle third or central portion of this arc is cut away or grooved to form the air gaps shown at 21 and 22. The extent of these cut-away gap portions is, therefore, 45 degrees, and the angular space between the adjacent sides of the magnet poles 2 and 2' and the coil cores 3 and 4, is, therefore, 45 degrees (see Figs. 3 and 5). On account of the length of the arcs of the inductor shoes being 135 degrees in extent and the length of the air gaps 21 and 22 being 45 degrees and located in the middle or center part of the inductor shoes, the outer curved surface of the same will be divided into three equal portions. The effect of this construction being that in rotating these shoes, one end, as 28, would be approaching the horn or corner portion 29 of the laminated core, as 3, while the other end 30 of the shoes is approaching the corner or horn portion 31 of the magnetic pole 2. This construction gives a short circuit current nearly constant and slightly rising during rotation from the position just after that shown in Fig. 3 to that in Fig. 5. This interval between points 32 and 33 on the curve represents nearly 45 degrees of rotation or ninety electrical degrees, within which as a range of adjustment sufficient sparks may be obtained.

I do not confine myself to the equal 45 degrees spacing mentioned above since it is obvious that the same principle may be applied to good effect with modifications in the dimensions of parts and spacing to suit mechanical convenience or lesser requirement in angle of adjustment.

It is to be understood by the term "coil poles" that it refers to the poles upon which the induction coils 16 are placed in contradistinction to those poles which refer to the field magnets of the permanent magnets.

What I claim is:

1. An electric generator of the inductor type, comprising in combination, means having magnet poles for producing a magnetic field, inductive core-members spaced between the magnet poles of the field, a coil between the core-members, means including grooved inductor members for conveying the magnetic flux from the magnet poles to the inductive core-members and coil for generating an electric current in the coil, said grooves in the inductor members being located in their peripheries, whereby the peak portion of whose wave is substantially rectangular.

2. In a magneto-electric machine, of the inductor alternator type, the combination, means for producing a magnetic field, core members spaced therefrom, an induction coil between the core-members, sector shaped inductor shoes having grooves or air-gaps formed in their middle peripheral portions, the angular dimensions of the poles of the field producing means, core members and air gaps in the inductor shoes being equal to each other.

3. In a magneto-electric machine, of the inductor alternator type, the combination, means for producing a magnetic field, core members spaced therefrom, an induction coil between the core members, sector shaped inductor shoes having grooves or air gaps formed in their middle peripheral portions, and the angular dimensions of the inductor shoes at the opposite ends of the air gaps therein being equal in angular dimension to the poles of said field producing means.

4. In a magneto electric machine of the inductor alternator type, the combination, field magnets constituting a magnetic circuit and having pole pieces, a core-member, an induction coil arranged in the magnetic circuit of the core member, an inductor shoe for permitting the magnetic flux to flow from the pole-piece of the field magnets to the core-member, said shoe having a groove formed therein adjacent the air gap between the pole piece and the inductor shoe, whereby during rotation of the shoe one end of the shoe is approaching a horn or corner of the core member while a corner or edge of the groove of the shoe is approaching a corner or horn of the pole piece of the field magnet.

5. In a magneto electric machine, of the inductor alternator type for ignition purposes, in combination, field magnets, core-members, an induction coil included in the magnetic circuit of the core members, sector shaped inductor shoes, said shoes being formed with an arc of 135 degrees, and grooves or air gaps in portions of the periphery of the arcs of the shoes, the angular dimensions of the poles of the field magnets and core members each being equal to the width of the grooves in the shoes, the angular spaces between the adjacent sides of the poles of the field magnets and core members being equal to the angular lengths of the grooves in the shoes, namely 45 degrees, the dimension of the arcs of the periphery adjacent the grooves in the inductor shoes being each equal to the angular distances of the grooves in the shoes, whereby the peaks of the current waves generated in the coil are substantially rectangular in form.

6. A magneto electric machine comprising a field magnet and core members, having poles that are arranged at right angles to each other and the length of the polar faces of each being 45 degrees in extent, an induction coil in the magnetic circuit of the members, inductor shoes mounted for rotation between the poles of the field magnet and core members, said shoes each having an arc of 135 degrees and a cut-out portion of 45 degrees in the middle part of the periphery of the shoes, whereby an arc of 45 degrees will be formed on each of the ends of the shoes, as described.

7. In a magneto electric machine of the inductor alternator type, the combination, a field magnet having a pole piece, a core member spaced therefrom to form a magnetic circuit, an induction coil arranged in the magnetic circuit of the core member, an inductor shoe permitting the magnetic flux to flow from the pole piece of the field magnet to the core member and separated therefrom by air gaps, said shoe having a groove formed therein adjacent the air gap, whereby during rotation of the shoe one end of the shoe is approaching a horn or corner of the core-member while a corner of the groove in the shoe is approaching a corner or horn of the field magnet.

8. An electric generator of the inductor alternator type for ignition purposes, comprising, in combination, means having poles for producing a magnetic field, magnetizable core members having poles between the poles of the field, a coil on the core members, arc-shaped inductor means to convey the magnetic flux from the poles of the field to the poles of the core members for generating an alternating electric current, the inductor means having grooves, the angular dimensions of which are equal to the angular dimensions of the poles and core-members, said grooves being located at the center portion of the arc of the inductor means.

9. An electric generator of the inductor alternator type, comprising, in combination, means having poles for producing a magnetic-field, core-members having poles that are angularly spaced from the poles of the field, an induction coil on the core members, means comprising arc-shaped inductors formed with grooves in their outer surfaces and of a length in degrees that is equal to the arcuate length of said poles, to convey the magnetic flux from the poles of the field to the poles of the core members.

10. A magneto electrical machine, comprising in combination, field magnets, core-members, an induction coil having its core included in the magnetic circuit of the core-members, rotatable inductor means for conducting the magnetic flux from the field magnets to the core-members, said means comprising inductor members having grooved peripheral portions and the grooved portions being designed and arranged to cause the generation of a current wave in the coil, the peak portions of which wave are substantially rectangular, the range of the peak portions constituting substantially 90 electrical degrees.

11. A magneto electrical machine comprising in combination field magnets, core members comprising a magnetic circuit and spaced from the poles of the field magnets, an induction coil having a core included in the circuit of said core members, rotatable arc-shaped inductor members for conducting the magnetic flux from the field poles to the core members, said members being laterally spaced from each other a distance equal to the width of the poles of the field magnets, and having grooves formed in the periphery of the arc shaped rotatable inductor members substantially midway of the length of their peripheries for the purpose described.

12. An apparatus for producing an alternating current for ignition purposes in which the range of the spark current takes place through an angle of substantially 45 degrees of rotation and an angle of 90 electrical degrees, comprising field magnets formed with poles, core-members arranged 90 degrees from said poles, an induction coil included in the magnetic circuit thereof, rotatable inductor members for conveying an alternating magnetic flux from the poles of the field to the core members, said inductor members having their inner edges parallel to each other and spaced from each other a distance equal to the width of the poles of the field magnets and the poles of the core members, said rotatable inductor members having grooves in the middle third portion of their outer peripheral surfaces and equal in width to the lateral space between the said members, whereby a current wave curve is produced, the peak portions of which are substantially rectangular extending through 45 degrees of rotation of the inductor members and 90 electrical degrees.

EDWARD T. SHAW.